United States Patent
Manabe

(10) Patent No.: US 12,227,860 B2
(45) Date of Patent: Feb. 18, 2025

(54) METHOD FOR PURIFYING GAS FORMED BY ELECTROLYSIS, AND ELECTROLYTIC APPARATUS

(71) Applicant: DE NORA PERMELEC LTD, Fujisawa (JP)

(72) Inventor: Akiyoshi Manabe, Kanagawa (JP)

(73) Assignee: DE NORA PERMELEC LTD, Fujisawa (JP)

(*) Notice: Subject to any disclaimer, the term of this patent is extended or adjusted under 35 U.S.C. 154(b) by 622 days.

(21) Appl. No.: 17/439,290

(22) PCT Filed: Mar. 27, 2020

(86) PCT No.: PCT/JP2020/014034
§ 371 (c)(1),
(2) Date: Sep. 14, 2021

(87) PCT Pub. No.: WO2020/196835
PCT Pub. Date: Oct. 1, 2020

(65) Prior Publication Data
US 2022/0154356 A1    May 19, 2022

(30) Foreign Application Priority Data
Mar. 27, 2019 (JP) ................. 2019-060832

(51) Int. Cl.
*C25B 15/08* (2006.01)
*B01D 19/00* (2006.01)
(Continued)

(52) U.S. Cl.
CPC ........ *C25B 15/083* (2021.01); *B01D 19/0031* (2013.01); *C25B 1/04* (2013.01);
(Continued)

(58) Field of Classification Search
CPC .... C25B 1/04; C25B 1/26; C25B 9/19; C25B 15/083; C25B 15/087; B01D 19/0031
See application file for complete search history.

(56) References Cited

U.S. PATENT DOCUMENTS

| 4,323,442 A | 4/1982 | Lantin et al. |
| 2004/0053564 A1 | 3/2004 | Mizuno |

(Continued)

FOREIGN PATENT DOCUMENTS

| CN | 101457379 A | 6/2009 |
| CN | 207347667 | 5/2018 |

(Continued)

OTHER PUBLICATIONS

Office Action issued for Chinese Patent Application No. 202080024747. 4, dated Oct. 31, 2023, 8 pages, table on page 1 shows 2 references as relevant.

(Continued)

*Primary Examiner* — Ciel P Contreras
(74) *Attorney, Agent, or Firm* — HSML P.C.

(57) ABSTRACT

Disclosed is a purification method of electrolytic gas generated from an electrolysis cell having a cathode and an anode. In a step of performing electrolysis of an electrolyte solution supplied into the electrolysis cell and repeating the electrolysis while circulating the electrolyzed electrolyte solution via an circulation tank disposed outside the electrolysis cell, a bag-shaped membrane pack, which is made from a specific porous membrane material, is of a shape having an opening at a top end thereof and closed at an entire side wall and entire bottom wall thereof and has a large permeation area at the entire side wall and entire bottom wall, is disposed in an interior of the circulation tank, thereby enabling to perform the electrolysis while purifying the electrolyte solution in which a portion of the electrolytic gas generated by the electrolysis is dissolved and bubbles of another portion of the electrolytic gas coexist.

4 Claims, 2 Drawing Sheets

(51) Int. Cl.
    C25B 1/04       (2021.01)
    C25B 1/26       (2006.01)
    C25B 9/19       (2021.01)
(52) U.S. Cl.
    CPC .................. *C25B 1/26* (2013.01); *C25B 9/19* (2021.01); *C25B 15/087* (2021.01)

(56) References Cited

U.S. PATENT DOCUMENTS

2016/0090657 A1*  3/2016  Nigel ................... C25B 11/075
                                                        204/268
2016/0368789 A1  12/2016  Manabe et al.
2018/0334751 A1* 11/2018  Manabe ................ C25B 11/051

FOREIGN PATENT DOCUMENTS

| JP | 56-127781 | 10/1981 | | |
|----|-----------|---------|---|---|
| JP | 2004-090147 | 3/2004 | | |
| JP | 2015-029921 | 2/2015 | | |
| JP | 2017119895 A | * 7/2017 | ............... | C25B 1/04 |
| JP | 2018-111054 | 7/2018 | | |

OTHER PUBLICATIONS

Extended European Search Report, issued in the corresponding European patent application No. 20777757.4, dated Sep. 11, 2023, 7 pages.

International Search Report issued in International Application No. PCT/JP2020/014034, Jun. 16, 2020, 5 pages w/translation.

* cited by examiner

[Figure 1]
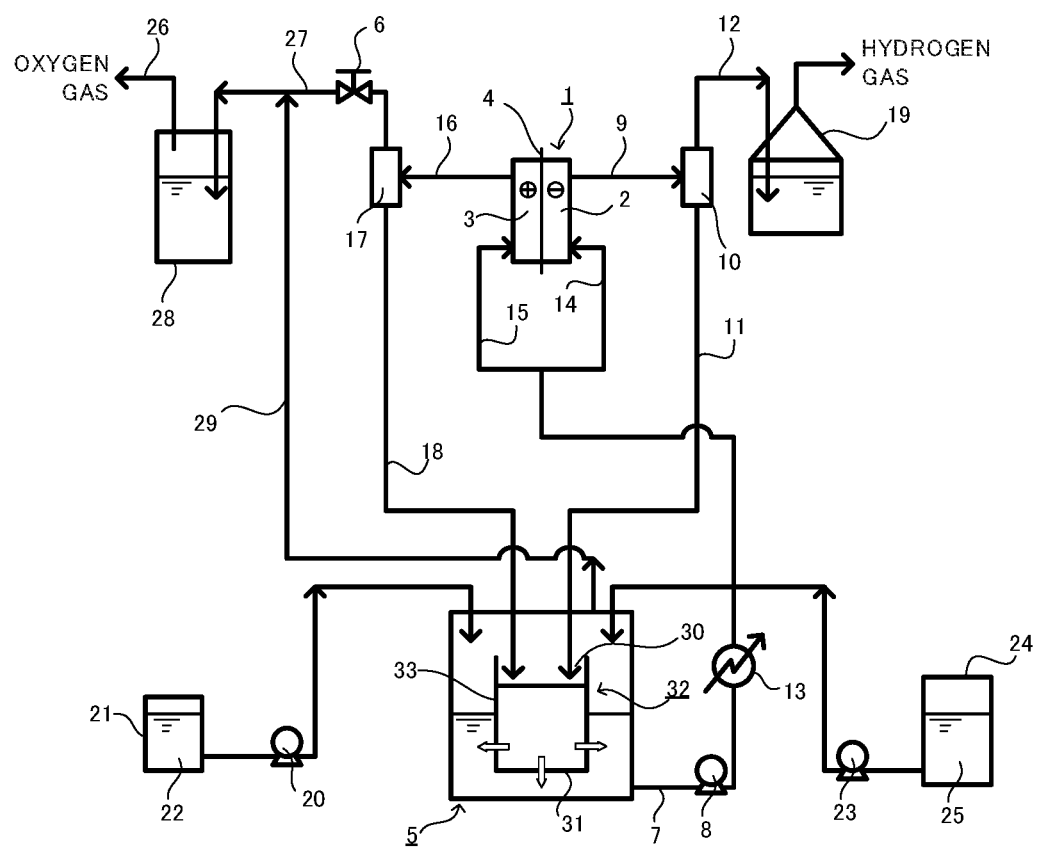

[Figure 2]
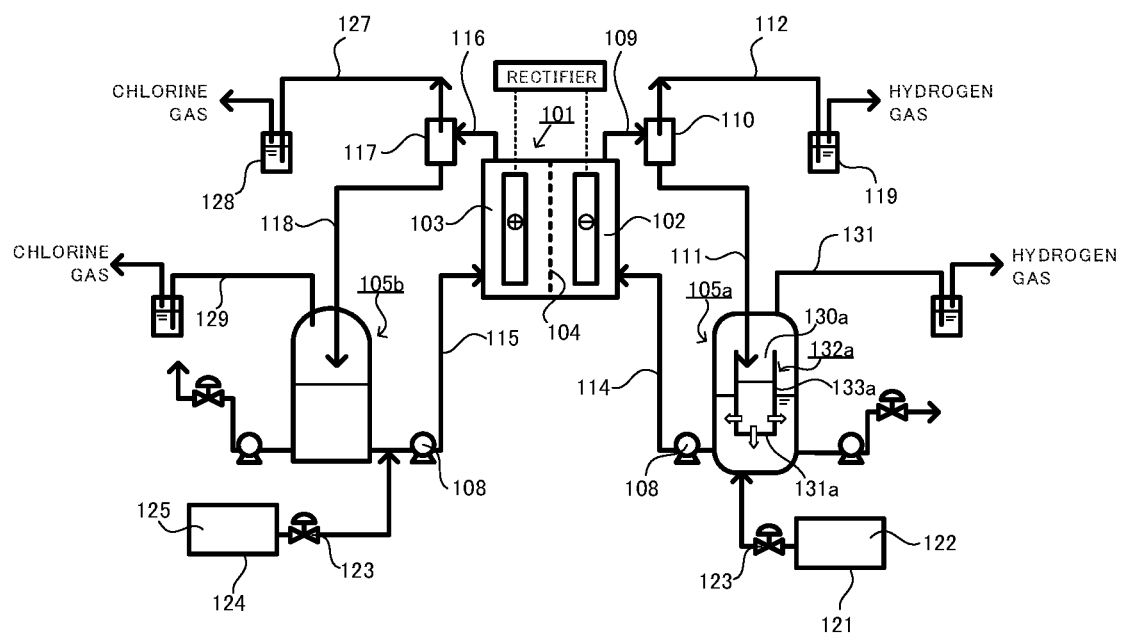

METHOD FOR PURIFYING GAS FORMED BY ELECTROLYSIS, AND ELECTROLYTIC APPARATUS

TECHNICAL FIELD

The present invention relates to a purification method of electrolytic gas and an electrolysis system, which in an electrolysis process, efficiently and highly purify cathode gas and anode gas produced by electrolysis. In particular, the present invention relates to an electrolysis system and a purification method of electrolytic gas, which produce highly purified hydrogen gas by electrolysis.

BACKGROUND ART

In alkaline water electrolysis, electrolysis of non-purified water, brine electrolysis, electrolysis of aqueous chloride solution, aqueous bromide solution, aqueous hydrochloric acid solution, and aqueous sulfuric acid solution, and the like, hydrogen gas generates from a cathode chamber by electrolysis. As examples of an electrolysis system and electrolysis method that generates hydrogen gas, there are an alkaline water electrolysis system and an alkaline water electrolysis method described in Patent Literature 1. In the electrolysis method described in Patent Literature 1, an aqueous alkaline solution is supplied as an electrolyte solution to an anode chamber and a cathode chamber of an electrolysis cell in which the anode chamber and the cathode chamber are separated by a membrane, and is continuously subjected to an electrolysis treatment while being circulated via a circulation tank. Described specifically, a catholyte subjected to the electrolysis treatment in the cathode chamber of the electrolysis cell and hydrogen gas as cathode side electrolytic gas are discharged from the cathode chamber, and after separation of the hydrogen gas from the catholyte and hydrogen gas discharged from the cathode chamber, the catholyte after the gas separation is supplied to the circulation tank. Concurrently, an anolyte subjected to the electrolysis treatment in the anode chamber and oxygen gas as anode side electrolytic gas are discharged from the anode chamber, and after separation of the oxygen gas from the anolyte and oxygen gas discharged from the anode chamber, the anolyte after the gas separation is supplied to the circulation tank. Continuous electrolysis is then performed while mixing the catholyte and the anolyte in the circulation tank so that electrolyte solutions to be supplied to the respective electrolysis chambers are controlled to the same concentration and are always maintained constantly at the concentration.

In recent years, it has become important to stop depending on fossil fuels for prevention of global warming, leading to extensive research on use of hydrogen gas as an alternative energy source. Use of hydrogen gas produced by electrolysis is also expected.

CITATION LIST

Patent Literature

Patent Literature 1: JP 2015-29921 A

SUMMARY OF INVENTION

Technical Problem

Into hydrogen gas produced through electrolysis by an alkaline water electrolysis system that uses a membrane, however, oxygen gas generated on a side of an anode diffuses into a counter electrode chamber, that is, a cathode chamber through the membrane due to a phenomenon such as concentration diffusion, and is mixed as an impurity. It has hence been difficult to achieve a high concentration of, for example, 99.95% or higher in purity. Therefore, hydrogen gas produced by electrolysis is sent to a reaction column, and is highly purified by a method such as a method that eliminates oxygen gas, which is contained as an impurity in the hydrogen gas, using a metal catalyst. However, the metal catalyst used in the purification deteriorates during long-term use, needs a regeneration treatment or a timely replacement with a new one, and is costly. Moreover, as a purification system, the installation of a reaction column of a sufficient capacity is also needed, and a significant utility cost is also required to improve the purity of hydrogen gas.

Different from the foregoing, a purity of 99.95% level may be achieved by making a design change such as increasing the thickness of a membrane in an alkaline water electrolysis system that uses the membrane. However, such a change leads to a higher membrane resistance, an increased cell voltage during operation, and as a consequence a higher power consumption. Hence, such an alkaline water electrolysis system can no longer be considered to be a high-performance electrolysis system, in other words, a realistic system.

In electrolysis such as alkaline water electrolysis, electrolysis of non-purified water, brine electrolysis, electrolysis of aqueous chloride solution, aqueous bromide solution, aqueous hydrochloric acid solution and aqueous sulfuric acid solution, and electrolysis of water using solid polymer as electrolyte, hydrogen gas is produced from a cathode chamber whichever the electrolysis is. Concurrently, anode side electrolytic gases such as oxygen gas, ozone gas and/or chlorine gas are produced from an anode chamber. These anode side electrolytic gases such as oxygen gas may be released into the atmosphere, or may be recovered and provided for another use. In the latter case, high purification of the anode side electrolytic gases is also desired. Nonetheless, no efficient high purification method has yet been found for anode side electrolytic gases such as oxygen gas.

In the conventional electrolysis system, electrolytic gases such as hydrogen gas and oxygen gas are separated from an electrolyte solution by gas/liquid separators. Further, in the alkaline water electrolysis system, an alkaline electrolyte solution mixed in a circulation tank is used under circulation in an anode chamber and a cathode chamber. Therefore, joint migration of dissolved gas and fine gas bubbles, which are mixed in the supply electrolyte solution, into gas phases, specifically electrolytic gases generating from respective electrodes cannot be avoided. This joint migration is a primary cause of the mixing of impurities into target electrolytic gas or gases. In brine electrolysis, on the other hand, there are two cases, one using an anolyte and a catholyte without circulation, the other using them under circulation. In either case, however, impurities such as coexisting gas exist in the supply electrolyte solution in a cathode chamber so that hydrogen gas produced in the cathode chamber contains the impurities, and requires high purification.

As described above, in an electrolysis system for an aqueous solution, hydrogen gas generates as cathode side electrolytic gas, and as anode side electrolytic gas, oxygen gas or halogen gas such as chlorine gas generates depending on the electrolyte solution system. Due to the coexistence of dissolved gas or fine gas bubbles in the anolyte or catholyte, these electrolytic gases, for example, hydrogen gas contains oxygen gas and the like existing as impurities, and oxygen gas contains hydrogen gas and the like mixed as impurities. There has hence been a problem that simple production of high-purity electrolytic gases is hardly feasible.

The present invention therefore has as objects thereof the provision of an electrolysis system and a purification method of electrolytic gas, which can solve the problems of the conventional technique and can improve the purity of, for example, hydrogen gas as cathode side electrolytic gas and in some instances, can also improve the purity of anode side electrolytic gas such as oxygen gas by simple means that can reduce a process load and running cost without needing relatively costly facilities using a metal catalyst and a reaction column.

Solution to Problems

The above-described objects can be achieved by the present invention that will be described hereinafter. The present invention provides, as a first solving means, the following purification method of electrolytic gas.

[1] A purification method of electrolytic gas, which generates from an electrolysis cell having a cathode and an anode, including, in a step of performing electrolysis of an electrolyte solution supplied into the electrolysis cell and repeating the electrolysis while circulating the electrolyzed electrolyte solution via an circulation tank disposed outside the electrolysis cell, electrolyzing the electrolyte solution with coexisting bubbles of electrolytic gas under purification, whereby the electrolytic gas is purified. The purification method includes: disposing a bag-shaped membrane pack, which is made from a porous membrane material of a construction that causes the electrolytic gas and gas bubbles of large diameter, the gas bubbles coexisting with the electrolyte solution, to remain without permeation, is of a shape having an opening at a top end thereof and closed at an entire side wall and entire bottom wall thereof and has a large permeation area at the entire side wall and entire bottom wall, in an interior of the circulation tank with a clearance left between the bag-shaped membrane pack and an inner wall of the circulation tank, supplying the electrolyte solution with the coexisting bubbles of the electrolytic gas from the opening of the bag-shaped membrane pack into an interior of the bag-shaped membrane pack, allowing the electrolyte solution, which has been supplied into the interior of the bag-shaped membrane pack, and gas bubbles of small diameter, which coexist with the electrolyte solution, to permeate from the bag-shaped membrane pack into the circulation tank through the entire side wall and the entire bottom wall under a differential pressure caused by an own weight of the electrolyte solution, thereby causing the electrolytic gas and the gas bubbles of large diameter to remain in the interior of the bag-shaped membrane pack, and repeating the electrolysis while continuously circulating the electrolyte solution with fewer coexisting gas bubbles from the circulation tank to the electrolysis cell, whereby the electrolytic gas generated from the electrolysis cell is purified.

The present invention provides, as a second solving means, the following purification method of electrolytic gas.

[2] The purification method as described above in [1]. The purification method includes: using, as the electrolysis cell, an alkaline water electrolysis cell having a cathode chamber and an anode chamber separated by a membrane or an ion exchange membrane and having the cathode and the anode in the cathode chamber and the anode chamber, respectively, supplying an electrolyte solution of a common composition with a caustic alkali contained therein as a catholyte and an anolyte into the anode chamber and the cathode chamber of the electrolysis cell, using the electrolysis circulation tank as a common circulation tank common to the catholyte and the anolyte, allowing cathode side electrolytic gas to generate in the cathode chamber and anode side electrolytic gas to generate in the anode chamber, supplying the cathode side electrolytic gas, the catholyte and gas bubbles coexisting with the catholyte and the anode side electrolytic gas, the anolyte and gas bubbles coexisting with the anolyte from the opening into the interior of the bag-shaped membrane pack, allowing the catholyte, the anolyte and gas bubbles of small diameter, the gas bubbles coexisting with the catholyte and the anolyte, respectively, to permeate from the bag-shaped membrane pack into the common circulation tank through the entire side wall and the entire bottom wall of the bag-shaped membrane pack under a differential pressure caused by own weights of the catholyte and the anolyte supplied into the bag-shaped membrane pack, thereby causing the cathode side electrolytic gas, the anode side electrolytic gas, and gas bubbles of large diameter, the gas bubbles coexisting with the catholyte and the anolyte, respectively, to remain in the interior of the bag-shaped membrane pack, and repeating the electrolysis while continuously circulating the electrolyte solution of the common composition with fewer ones of the gas bubbles, which coexisted with the catholyte and the anolyte, respectively, from the common circulation tank to the electrolysis cell. Hydrogen gas as the cathode side electrolytic gas or the hydrogen gas and oxygen gas as the anode side electrolytic gas are hence purified.

The present invention provides, as a third solving means, the following electrolysis system.

[3] An electrolysis system for obtaining purified electrolytic gas by performing electrolysis of an electrolyte solution supplied into an electrolysis cell having a cathode and an anode, continuously performing an electrolysis treatment while circulating the electrolyzed electrolyte solution by an circulation tank, and recovering electrolytic gas. The electrolysis system includes the electrolysis cell into which the electrolyte solution is supplied, the circulation tank for circulating the electrolyte solution through the electrolysis cell, and a bag-shaped membrane pack disposed in an interior of the circulation tank with a clearance left between the bag-shaped membrane pack and an inner wall of the circulation tank. The bag-shaped membrane pack is made from a porous membrane material of a construction that causes the electrolyte solution and gas bubbles of large diameter, the gas bubbles coexisting with the electrolyte solution, to remain without permeation, is of a shape having an opening at a top end thereof and closed at an entire side wall and entire bottom wall thereof and has a large permeation area at the entire side wall and entire bottom wall. The bag-shaped membrane pack is configured to enable purification of the electrolytic gas, which generates from the electrolysis cell, by: supplying the electrolyte solution with coexisting bubbles of the electrolytic gas from the opening of the bag-shaped membrane pack into an interior of the bag-shaped membrane pack, allowing the electrolyte solution, which has been supplied into the interior of the bag-shaped membrane pack, and gas bubbles of small diameter, which coexist with the electrolyte solution, to permeate from the bag-shaped membrane pack into the circulation tank through the entire side wall and the entire bottom wall of the bag-shaped membrane pack under a differential pressure caused by an own weight of the electrolyte solution, thereby causing the electrolytic gas and the gas bubbles of large diameter, the gas bubbles coexisting with the electrolyte solution, to remain in the interior of the bag-shaped membrane pack, and repeating the electrolysis while continuously circulating the electrolyte solution with fewer coexisting gas bubbles from the circulation tank to the electrolysis cell.

The present invention provides, as a fourth solving means, the following electrolysis system.

[4] The electrolysis system as described above in [3]. The electrolysis cell has a cathode chamber and an anode chamber separated by a membrane or an ion exchange membrane, and has the cathode and the anode in the cathode chamber and the anode chamber, respectively. An anolyte and a catholyte, which are supplied into the electrolysis cell, are comprised of aqueous caustic alkali solutions of a common composition. The circulation tank is a common circulation tank, which is common to the catholyte and the anolyte, for mixing the catholyte and the anolyte and supplying the catholyte and the anolyte as the aqueous caustic alkali solutions of the common composition to both the cathode chamber and the anode side chamber, respectively. Hydrogen gas generated as cathode side electrolytic gas in the cathode chamber or the hydrogen gas and oxygen gas generated as anode side electrolytic gas in the anode chamber are purified by: supplying the cathode side electrolytic gas, the catholyte and gas bubbles coexisting with the catholyte and the anode side electrolytic gas, the anolyte and gas bubbles coexisting with the anolyte from the opening into the interior of the bag-shaped membrane pack, allowing the catholyte, the anolyte and gas bubbles of small diameter, the gas bubbles coexisting with the catholyte and the anolyte, respectively, to permeate from the bag-shaped membrane pack into the common circulation tank through the entire side wall and the entire bottom wall of the bag-shaped membrane pack under a differential pressure caused by own weights of the catholyte and the anolyte supplied into the interior of the bag-shaped membrane pack, thereby causing the cathode side electrolytic gas, the anode side electrolytic gas, and gas bubbles of large diameter, the gas bubbles coexisting with the catholyte and the anolyte, respectively, to remain in the interior of the bag-shaped membrane pack, and repeating the electrolysis while continuously circulating the electrolyte solution of the common composition with fewer ones of the gas bubbles, which coexisted with the catholyte and the anolyte, respectively, from the common circulation tank to the electrolysis cell.

Advantageous Effects of Invention

The present invention is characterized in that in a step of performing electrolysis of an electrolyte solution supplied into an electrolysis cell having a cathode and an anode and repeating the electrolysis while circulating the electrolyzed electrolyte solution via an circulation tank disposed outside the electrolysis cell, a bag-shaped membrane pack (which may hereinafter be also called "bag-shaped membrane pack" or "membrane bag"), which is made from a specific porous membrane material, is of a shape having an opening at a top end thereof and closed at an entire side wall and entire bottom wall thereof and has a large permeation area at the entire side wall and entire bottom wall, is disposed in an interior of the circulation tank. Owing to the configuration as described above, it is possible to electrolyze the electrolyte solution, in which a portion of electrolytic gas generated by the electrolysis is dissolved and bubbles of another portion of the electrolytic gas coexist, while purifying it, thereby realizing purification of the electrolytic gas that the electrolytic gas generated from the electrolysis cell is purified.

According to the present invention, the electrolytic gas and gas bubbles of large diameter coexisting in the electrolytic gas (which may hereinafter be also called "coexisting gas bubbles of large diameter") are separated and held in the bag-shaped membrane pack (membrane bag), while the electrolyte solution, which contains gas bubbles of small diameter coexisting with the electrolyte solution (which may hereinafter be also called "existing gas bubbles of small diameter") and gas dissolved in the electrolyte solution, is re-electrolyzed in the electrolysis cell. Therefore, the coexisting gas bubbles of large diameter are not circulated to the electrolysis cell, and as a consequence the electrolytic gas is purified.

The present application claims Convention priority based on Japan Patent Application No. 2019-060832 (called "the application based on which the priority is claimed"), and describes the details of the application, based on which the priority is claimed, in their entirety. Upon filing the present application claiming the priority, the "bag-shaped membrane pack" that characterizes the present invention was rephrased as will be described hereinafter. This rephrasing is a change in expression, and as will be mentioned hereinafter, is by no means any change in substance to the invention of the application based on which the priority is claimed. The application based on which the priority is claimed described: "the above-described bag-shaped membrane pack (membrane bag) is made from an aqueous solution permeable membrane", and about the construction of the bag-shaped membrane pack (membrane bag), "a simple construction that the above-described electrolytic gas and gas bubbles of large diameter coexisting in the electrolyte solution are separated and held in the bag-shaped membrane pack (membrane bag) while the electrolyte solution with coexisting gas bubbles of small diameter is allowed to permeate the bag-shaped membrane pack (membrane bag)", and also "the electrolyte solution is allowed to permeate the membrane, which serves to perform the separation into the electrolyte solution with coexisting gas bubbles of small diameter contained therein and the electrolyte solution with gas bubbles of large diameter (coexisting gas bubbles) contained therein, by making larger the permeation area of the membrane". In the present invention, "the bag-shaped membrane pack" is defined that "it is made from a porous membrane material of a construction that causes the electrolytic gas and gas bubbles of large diameter, the gas bubbles coexisting with the electrolyte solution, to remain without permeation, is of a shape having an opening at a top end thereof and closed at an entire side wall and entire bottom wall thereof, and has a large permeation area at the entire side wall and entire bottom wall".

As mentioned above, according to the present invention, the gas bubbles in the electrolyte solution to be circulated become fewer, and moreover the coexisting gas bubbles of large diameter are no longer circulated to the electrolysis cell, so that the coexisting gas as impurities in the supply electrolyte solution is reduced in concentration. Therefore, the dissolved gas in the electrolyte solution is suppressed from migrating from the liquid phase to the gas phase along with the gas generating at the electrode during re-electrolysis, whereby the product gas is no longer reduced in purity and quality and the electrolytic gas can be improved in purity. In particular, among the gas bubbles coexisting in the electrolyte solution the anode side electrolytic gas such as oxygen gas or chlorine gas is prone to be large in average diameter, and therefore the invention purification method of electrolytic gas, when applied, can bring about pronounced advantageous effects, and is useful.

In other words, in the present invention, the permeation of, for example, anode side electrolytic gas coexisting in the electrolyte solution and having large bubble diameter, such as oxygen gas or chlorine gas, into the circulation tank is suppressed by merely disposing the above-described bag-shaped membrane pack (membrane bag) in the circulation tank and configuring to allow the electrolyte solution in the bag-shaped membrane pack to permeate into the electrolysis circulation tank upon circulation of the electrolyte solution. According to the present invention, by the simple means described above, oxygen gas or the like, which exists as an impurity in hydrogen gas as cathode side electrolytic gas, is readily eliminated, and as a consequence highly purified hydrogen gas can be produced.

Described more specifically, the present invention can obviate a reaction column using a metal catalyst and some other facilities, which have been employed in the conventional technique to purify hydrogen gas as cathode side electrolytic gas, can reduce a process load, and can improve the purity of hydrogen gas as anode side electrolytic gas to at least 99.94% or higher by simple means without additional installation of hydrogen purification facilities. According to the present invention, with the simple disposition of the bag-shaped membrane pack in the circulation tank, purification to high purity is also feasible with respect to anode side electrolytic gas such as oxygen gas without arrangement of any space-requiring ancillary facilities. According to the present invention, the volume of facilities can be also reduced as it is unnecessary to use any ancillary facilities or additional process step. Moreover, the electrolysis system is free of vibrations or noise, or from mechanical damage during long-term operation, and can be stably operated over a long term, so that the facilities maintenance cost can be reduced significantly.

On the other hand, the gas dissolved in the electrolyte solution and the coexisting gas bubbles of small diameter are allowed to permeate from the interior of the bag-shaped membrane pack into the circulation tank, are circulated along with the electrolyte solution to the electrolysis cell, and are re-electrolyzed. Even if new gas violently generates by the re-electrolysis, the dissolved gas and the coexisting gas bubbles of small diameter are however not converted by the new gas to impurity gas that would otherwise migrate from the liquid phase to the gas phase, thereby enabling to obtain electrolytic gas of high purity. According to the present invention, the electrolytic gas can hence be purified through normal operation by leveraging the differential pressure caused by the own weight without arrangement of a special high-pressure pump or the like in the process.

In contrast, the following problem arises if continuous operation is performed by the conventional technique in a system that electrolyzes an electrolyte solution. In water electrolysis, for example, hydrogen gas generates as cathode side electrolytic gas, and oxygen gas generates as anode side electrolytic gas, so that bubbles of the hydrogen gas as the cathode side electrolytic gas and bubbles of the oxygen gas as the anode side electrolytic gas concurrently coexist in the electrolyte solution. It is known that bubbles of hydrogen gas have relatively small diameter and bubbles of oxygen gas have relatively large diameter. Now assume that upon continuous electrolysis of the electrolyte solution under circulation, the electrolyte solution formed in the electrolysis cell is circulated for re-electrolysis directly from the circulation tank to the electrolysis cell without using the bag-shaped membrane pack that makes up the present invention. The bubbles of oxygen gas, which are coexisting gas bubbles of large diameter, are therefore circulated along with the electrolyte solution to the electrolysis cell. At the cathode, the electrolyte solution is then agitated vigorously by gas (hydrogen gas) generated at the electrode during re-electrolysis, and the oxygen gas dissolved in the electrolyte solution and the bubbles of oxygen gas coexisting in the electrolyte solution are mixed as an impurity, i.e., oxygen gas along with the generated gas into hydrogen gas, leading to reductions in the purity and quality of the hydrogen gas as the electrolytic gas.

In other words, according to a study by the present inventor, if continuous operation is performed in a system that electrolyzes an electrolyte solution by the conventional method, a gas/liquid mixed fluid generates during electrolysis, gas bubbles coexisting with the electrolyte solution cannot be eliminated or separated even when subjected to a first-stage gas/liquid separator, and are supplied to a circulation tank. Therefore, the coexisting gas bubbles are concurrently circulated along with the electrolyte solution to an electrolysis cell.

BRIEF DESCRIPTION OF DRAWINGS

FIG. 1 is a flow diagram illustrating purification of hydrogen gas as cathode side electrolytic gas and oxygen gas as anode side electrolytic gas by an alkaline water electrolysis system as an example of the present invention.

FIG. 2 is a flow diagram illustrating purification of hydrogen gas as cathode side electrolytic gas, using a brine electrolysis system as another example of the present invention.

DESCRIPTION OF EMBODIMENTS

The present invention will next be described in detail based on its preferred embodiments. A description will first be made about the background that has led to this invention by the present inventor.

If desired to perform continuous operation of an electrolyte solution electrolysis system, a circulation tank is generally needed to perform electrolysis and re-use of the electrolyte solution. In such a system, a gas/liquid mixed fluid is formed during electrolysis, and even when subjected to a first-stage gas/liquid separation means, gas bubbles coexisting in the fluid cannot be fully separated and the remaining gas bubbles are supplied to the circulation tank. Therefore, the electrolyte solution with the coexisting gas bubbles is supplied back to the electrolysis cell. If the electrolyte solution is electrolyzed here, the coexisting gas bubbles are violently agitated by gas generating at each electrode during re-electrolysis. Dissolved gas in the electrolyte solution is hence caused to migrate along with the generated gas from a liquid phase to a gas phase, and is then discharged along with the generated gas from the electrolysis cell. If the generated gas is recovered as a product at this time, the accompanying coexisting gas becomes an impurity, leading as a consequence to reductions in the purity and quality of the product gas. To solve this problem, the present inventor has enabled to conveniently and effectively separate and eliminate large coexisting gas bubbles in an electrolyte solution by disposing a bag-shaped membrane pack, which is made from a porous membrane material, is of a shape having an opening at a top end thereof and closed at an entire side wall and entire bottom wall thereof and has a large permeation area at these walls, in an circulation tank, thereby succeeding in improving the purity and quality of an electrolytic product.

In the course of research conducted to solve the above-mentioned problems of the conventional technique, the present inventor found, as a result of an investigation on properties of electrolytic gases such as hydrogen gas and oxygen gas like those described above, a tendency that gas bubbles coexisting in an electrolyte solution differ in size, bubbles of hydrogen gas are relatively small in diameter, and then oxygen gas and chlorine gas become greater in this order. As a result of a diligent study based on such a finding, the present inventor then found that by causing an electrolyte solution to pass through an aqueous solution permeable membrane such as an asbestos membrane after an electrolysis treatment, coexisting gas bubbles of large diameter are separated and held on an inner side of the membrane, and dissolved gas in the electrolyte solution and coexisting gas bubbles of small diameter are allowed to pass through the membrane, and the electrolyte solution can hence be separated into a portion of the electrolyte solution, with the coexisting gas bubbles of small diameter contained therein, and the remaining portion of the electrolyte solution, with the coexisting gas bubble of large diameter contained therein.

The present inventor also found a method that allows the electrolyte solution to flow at a predetermined flow rate through the membrane under a differential pressure caused by its own weight without needing any extra drive force (pressurization) for the permeation of the electrolyte solution through the membrane by enlarging the permeation area of the membrane for the separation of the electrolyte solution into the above-described portion of the electrolyte solution, with the coexisting gas bubbles of small diameter contained therein, and the above-described remaining portion of the electrolyte solution with the coexisting gas bubble of large diameter contained therein. This method is to dispose a bag-shaped membrane pack (membrane bag) formed of the membrane in an interior of a circulation tank. Further, when disposing the bag-shaped membrane pack in the interior of the circulation tank, the bag-shaped membrane pack may preferably be disposed at a position where when seen from above, the bag-shaped membrane pack forms, for example, a concentric circle with an inner peripheral wall of the tank with a clearance left there between (at a position where a double walled structure is formed inside the tank) (see FIGS. 1 and 2). Owing to the configuration as described above, the electrolyte solution that is about to circulate into the circulation tank is supplied into the bag-shaped membrane pack before its circulation through the electrolysis cell, thereby simply realizing substantial elimination of the gas bubbles coexisting in the electrolyte solution. In particular, the above-described configuration can improve the elimination rate of coexisting gas bubbles of large diameter that exist in the electrolyte solution after the electrolysis, so that the volume of gas to be mixed as an impurity into the electrolytic gas can be reduced. As a consequence, even if new gas violently generates upon re-electrolysis, the dissolved gas in the electrolyte solution is caused to migrate less as impurity gas along with the generated gas from the liquid phase to the gas phase, thereby realizing to obtain the electrolytic gas with high purity.

A description will hereinafter be made about an electrolysis system and a purification method of the present invention in an illustrative case in which an electrolyte solution is pure water or an electrolyte-containing aqueous solution. The electrolysis system of the present invention is of a configuration that it includes an electrolysis cell having an anode and a cathode, supplies an electrolyte solution to the electrolysis cell, and subjects the electrolyte solution to an electrolysis treatment, and is not different basically from the conventional electrolysis treatment method except that a bag-shaped membrane pack is disposed in an circulation tank. A fundamental configuration includes, for example, discharging a gas/liquid mixed fluid of the electrolyte solution, which has been subjected to the electrolysis treatment, and electrolytic gas from the electrolysis cell, supplying the discharged gas/liquid mixed fluid or the electrolyte solution, which has been obtained after separation of the electrolytic gas from the gas/liquid mixed fluid, to the circulation tank, and circulating the electrolyte solution, which has been supplied to the circulation tank, to the electrolysis cell to continuously electrolyze the electrolyte solution. The present invention is further characterized by the successful realization of the advantageous effect that the electrolytic gas is obtained as highly-purified electrolytic gas by performing the electrolysis as described above. Therefore, the present invention is characterized in that the following configuration is included, and as a consequence the following advantageous effect is obtained by performance of electrolysis as will be described hereinafter.

(1) The present invention has a configuration that a bag-shaped membrane pack, which is made from a porous membrane material of a construction that causes electrolytic gas and coexisting gas bubbles of large diameter to remain without permeation, is of a shape having an opening at a top end thereof and closed at an entire side wall and entire bottom wall thereof and has a large permeation area at the entire side wall and entire bottom wall, is disposed in an circulation tank with a clearance left between the bag-shaped membrane pack and an inner wall of the circulation tank.

(2) An electrolyte solution with coexisting bubbles of the electrolytic gas is supplied into an interior of the bag-shaped membrane pack from the opening of the bag-shaped membrane pack.

(3) The electrolyte solution supplied into the interior of the bag-shaped membrane pack, gas dissolved in the electrolyte solution and gas bubbles of small diameter coexisting with the electrolyte solution are allowed to permeate from the bag-shaped membrane pack into the circulation tank through the entire side wall and the entire bottom wall of the bag-shaped membrane pack, the entire side wall and the entire bottom wall having the large permeation area, under a differential pressure caused by an own weight of the electrolyte solution, (4) the electrolytic gas and the coexisting gas bubbles of large diameter are caused to remain in the interior of the bag-shaped membrane pack, and (5) the electrolyte solution, which has permeated into the circulation tank and contains fewer coexisting gas bubbles, is circulated to the electrolysis cell, and is continuously subjected to an electrolysis treatment (re-electrolyzed).

(6) Because the coexisting gas bubbles in the supply electrolyte, the gas bubbles being to become impurities, are made fewer, the dissolved gas in the electrolyte solution is suppressed from migrating along with electrolytic gases, which generate at respective electrodes during re-electrolysis, from the liquid phase to the gas phases, respectively.

(7) Owing to the configuration as described above, co-existing gas or gases of large diameter as an impurity or impurities are eliminate, for example, from hydrogen gas, oxygen gas and the like as electrolytic gases, and as a consequence the electrolytic gases are purified to high purity and are recovered.

No particular limitation is imposed on the bag-shaped membrane pack that characterizes the present invention, insofar as it is an aqueous solution permeable membrane having a filter function capable of allowing an electrolyte solution, which is an aqueous solution, to permeate therethrough and also capable of separating and holding coexisting gas bubbles of large diameter in the interior of the bag-shaped membrane pack and also allowing the electrolyte solution with fewer gas bubbles contained therein to permeate to an outside. For example, an asbestos membrane, a nonwoven fabric of PPS (polyphenylene sulfide), a chemically resistant nonwoven fabric impregnated with a polymer such as PTFE (polytetrafluoroethylene) or PSF (polysulfone), or the like is suitably used.

For increasing the efficiency of separation of coexisting gas bubbles of large diameter by the above-described bag-shaped membrane pack in the present invention, it is effective to increase the permeation area available for the electrolyte solution that permeates the bag-shaped membrane pack. The permeation area of the bag-shaped membrane pack for the electrolyte solution can be further increased, for example, by forming its entire side wall and entire bottom wall in a bellows shape. The permeation area can be further increased by forming the bag-shaped membrane pack in a shape similar or close to an interior shape of the circulation tank.

The above-described bag-shaped membrane pack that makes up the present invention is formed in the bag shape and is disposed in the circulation tank, whereby as illustrated in the figures, the interior of the circulation tank can be designed in a double-walled structure. The electrolyte solution is allowed to permeate through the entire side wall and the entire bottom wall of the bag-shaped membrane pack. Described specifically, the electrolyte solution supplied into the circulation tank migrates by its own weight into the circulation tank from various directions, specifically from front and rear, left and right, and bottom. Owing to the formation in the bag shape as described above, the entire side wall and entire bottom wall serve as walls through which the electrolyte permeates, thereby providing the large permeation area. Gas bubbles of large diameter such as oxygen gas, which will become an impurity, are efficiently eliminated, the resulting electrolyte solution is circulated to the electrolysis cell, and therefore hydrogen gas and the like can be produced with high purity.

If, for example, a planar membrane sheet is used in place of the bag-shaped membrane pack in the form of the membrane bag, and is disposed in an upper part of the circulation tank, on the other hand, the area through which the electrolyte solution can permeate is extremely small, and therefore the elimination of existing gas bubbles of large diameter, which has been achieved by the present invention, is not expected practically.

Embodiments of the present invention will be described hereinafter.

First Embodiment

FIG. 1 is a flow diagram illustrating an example of alkaline water electrolysis that uses an alkaline water electrolysis cell as an electrolysis cell 1, mixes a catholyte in a cathode chamber and an anolyte in an anode chamber in a common circulation tank 5, performs continuous electrolysis in the cathode chamber and the anode chamber, respectively, while circulating the catholyte and the anolyte together, and uses the purification method of the present invention to purify hydrogen gas as cathode side electrolytic gas and oxygen gas as anode side electrolytic gas. In FIG. 1, the alkaline water electrolysis system has the electrolysis cell 1. Illustrated are a cathode chamber 2 with a cathode received therein, an anode chamber 3 with an anode received therein, and a membrane 4 dividing the cathode chamber 2 and the anode chamber 3. A description will hereinafter be made with reference to FIG. 1.

As transfer paths for the electrolyte solution on a side of the cathode, a catholyte circulation means and a cathode side electrolytic gas separation means are arranged. The catholyte circulation means includes a catholyte supply means and a catholyte discharge means. The catholyte supply means has the common circulation tank 5, an electrolyte solution supply line 7 connected to a bottom part of the common circulation tank 5, a circulation pump 8, and a catholyte supply line 14. To the common circulation tank 5, pure water 22 is supplied by a pump 20 from a pure water tank 21, and alkaline water 25 is supplied by a pump 23 from an alkaline water supply tank 24. An electrolyte solution before an electrolysis treatment, which has been prepared by mixing in the common circulation tank 5, is supplied into the cathode chamber 2 via the electrolyte solution supply line 7, the circulation pump 8 and the catholyte supply line 14. However, operation of the pump 23 is performed only at the time of initial preparation of the electrolyte solution and when an alkali concentration has decreased through long-term operation. In the example of FIG. 1, a heat exchanger 13 is disposed in the electrolyte solution supply line 7.

In the catholyte discharge means, the catholyte is discharged from a cathode side gas/liquid mixed fluid discharge line 9 connected to an upper part of the cathode chamber 2, is separated by a cathode side gas/liquid separation means 10 into hydrogen gas as cathode side electrolytic gas and the catholyte. The catholyte after the separation of the hydrogen gas is supplied from an opening 30, which is formed through a top end of a bag-shaped membrane pack 32 disposed in the common circulation tank 5, into an interior of the bag-shaped membrane pack 32 through a catholyte circulation line 11. The bag-shaped membrane pack 32 is made from a porous membrane material that allows only the electrolyte solution and the coexisting gas bubbles of small diameter to permeate but does not allow the electrolytic gas and the gas bubbles of large diameter to permeate. The electrolyte solution with fewer coexisting gas bubbles is therefore allowed to permeate under a differential pressure caused by its own weight into the common circulation tank 5.

In the catholyte discharge means, the catholyte discharged from the cathode side gas/liquid mixed fluid discharge line 9 is separated by the cathode side gas/liquid separation means 10 into the hydrogen gas as the cathode side electrolytic gas and the catholyte. The catholyte after the separation of the hydrogen gas is supplied by the catholyte circulation line 11 to the bag-shaped membrane pack 32 that has the opening 30 at the top end thereof, is closed at an entire bottom wall 31 thereof, and is made from the aqueous solution permeable membrane. The bag-shaped membrane pack 32 is disposed in the common circulation tank 5, and the catholyte supplied into the bag-shaped membrane pack 32 is discharged from an entire side wall 33 and the entire bottom wall 31 of the bag-shaped membrane pack 32 into the common circulation tank 5.

In the catholyte supplied into the bag-shaped membrane pack 32 that characterizes the present invention and is made from the aqueous solution permeable membrane, dissolved oxygen gas and bubble-shaped oxygen gas, which have permeated from a counter electrode chamber separated by the membrane, that is, the anode chamber 3, and dissolved hydrogen gas and bubble-shaped hydrogen gas, which have generated through electrolysis in the cathode chamber, are mixed. In the present invention, it is configured that the bubble-shaped oxygen gas of large diameter remains in the bag-shaped membrane pack 32 and only the electrolyte solution, which contains the dissolved oxygen gas, the dissolved hydrogen gas and the bubble-shaped hydrogen gas of small diameter, is discharged from the interior of the bag-shaped membrane pack 32 into the common circulation tank 5. Accordingly, the coexisting bubble gas of large diameter is not circulated to the electrolysis cell.

The cathode side electrolytic gas separation means has the cathode side gas/liquid mixed fluid discharge line 9, the cathode side gas/liquid separation means 10, and the cathode side electrolytic gas discharge line 12. The cathode side gas/liquid separation means 10 is connected to a water seal unit 19 via the cathode side electrolytic gas discharge line 12. The water seal unit 19 holds water inside. The cathode side electrolytic gas discharge line 12 is immersed at a distal end thereof in the water inside the water seal unit 19. This configuration is intended to control the pressures in the anode chamber and cathode chamber in the electrolysis process, and the separated hydrogen gas is purified to high purity and is recovered. It is to be noted that as the gas/liquid separation means 10, a simple means of connecting a T-shaped pipe in the piping may be employed. This means requires merely a modification to such an extent as making a T-shaped coupler a little greater in diameter than normal line piping, and does not require any exceptional technique or skill. With this means, there is provided a process in which the gas/liquid mixed fluid is horizontally supplied, the gas is directed vertically in an upward direction, and the liquid is allowed to flow in a downward direction.

On the side of hydrogen gas in the alkaline water electrolysis, such gas/liquid separation is needed without exception. Concerning the anode side gas/liquid mixed fluid in the alkaline water electrolysis, on the other hand, the anode side gas/liquid mixed fluid may be supplied, as it is, to the circulation tank without any gas/liquid separation. If configured as described above, the anode side gas/liquid mixed fluid can be supplied, as it is, without separation of oxygen gas for the purpose of lowering the relative concentration of hydrogen in the circulation tank. This method therefore has a merit that the concentration of hydrogen in the circulation tank can be diluted using oxygen gas, which inevitably generates during electrolysis operation, without use of nitrogen gas.

It is to be noted that electrolytic gases, i.e., hydrogen gas and oxygen gas in upper parts of the bag-shaped membrane pack (membrane bag) 32 and the common circulation tank 5 are recovered or released into the atmosphere from a pipe 26 by way of a discharge pipe 29, an anode side electrolytic gas discharge line 27 and a water seal unit 28.

As transfer paths for the electrolyte solution on a side of the anode, an anolyte circulation means and an anode side electrolytic gas separation means are arranged. The anolyte circulation means includes an anolyte supply means and an anolyte discharge means. The anolyte supply means has the common circulation tank 5, the electrolyte solution supply line 7 connected to the bottom part of the common circulation tank 5, the circulation pump 8, and an anolyte supply line 15. An electrolyte solution, which has been prepared by mixing in the common circulation tank 5, is supplied into the anode chamber 3 via the electrolyte solution supply line 7, the circulation pump 8 and the anolyte supply line 15.

The anolyte discharge means is configured as will be described below. The anolyte discharged from an anode side gas/liquid mixed fluid discharge line 16 is separated by an anode side gas/liquid separation means 17 into oxygen gas as anode side electrolytic gas and the anolyte. The anolyte after the separation of the oxygen gas is supplied by an anolyte circulation line 18 to the bag-shaped membrane pack 32 having the opening 30 at the top end thereof, closed at the bottom wall 31, and made from the aqueous solution permeable membrane. The bag-shaped membrane pack 32 is disposed in the common circulation tank 5 as described above, and the anolyte supplied into the bag-shaped membrane pack 32 is discharged from the entire side wall 33 and the entire bottom wall 31 of the bag-shaped membrane pack 32 into the common circulation tank 5.

In the anolyte supplied into the bag-shaped membrane pack 32, dissolved hydrogen gas and bubble-shaped hydrogen gas, which have permeated from the counter electrode chamber, that is, the cathode chamber 2, and dissolved oxygen gas and bubble-shaped oxygen gas, which have generated through electrolysis at the anode, are mixed. Here, the bubble-shaped oxygen gas of large diameter and the like remain in the bag-shaped membrane pack 32 made from the aqueous solution permeable membrane. On the other hand, the electrolyte solution, which contains the dissolved oxygen gas, the dissolved hydrogen gas and the bubble-shaped hydrogen gas of small diameter, is discharged from the interior of the bag-shaped membrane pack 32 into the common circulation tank 5. As a result, bubble gas of large diameter such as bubble gas of oxygen is separated in the interior of the bag-shaped membrane pack 32, and therefore is suppressed from being circulated to the electrolysis cell. This suppressing effect relies upon the characteristics of the bag-shaped membrane pack so used. The electrolyte solution discharged from the interior of the bag-shaped membrane pack 32 into the common circulation tank 5, and is supplied by the circulation pump 8 to the anode chamber 3 via the electrolyte solution supply line 7 and the anolyte supply line 15.

The anode side electrolytic gas separation means has the anode side gas/liquid mixed fluid discharge line 16, the anode side gas/liquid separation means 17, and the anode side electrolytic gas discharge line 27. A valve 6 is arranged above the anode side gas/liquid separation means 17, and with the valve 6 kept open, the anode side electrolytic gas separated by the anode side gas/liquid separation means 17 is discharged to the water seal unit 28 via the anode side electrolytic gas discharge line 27. The water seal unit 28 holds water inside. The anode side electrolytic gas discharge line 27 is immersed at a distal end thereof in the water inside the water seal unit 28, and the separated oxygen gas as the anode side electrolytic gas is recovered or exhausted from the pipe 26.

According to this embodiment, the catholyte and the anolyte are both supplied to the common circulation tank 5 via the bag-shaped membrane pack 32, and then circulated to the cathode chamber and the anode chamber. Accordingly, the coexisting gas bubbles of large diameter remain in the bag-shaped membrane pack 32, and are not circulated to the cathode chamber and the anode chamber. Hence, the dissolved gas which will become an impurity in the electrolyte solution, is prevented from migrating along with electrolytic gases, which violently generate at the electrodes during re-electrolysis because of the coexisting gas bulls of large diameter, from the liquid phase to the gas phases, respectively, so that the product gases are not lowered in purity and quality. As a consequence, concurrently with the hydrogen gas as the cathode side electrolytic gas, the oxygen gas as the anode side electrolytic gas is also purified.

In the example of FIG. 1, the electrolyte solution is an alkaline water (for example, an aqueous KOH solution or an aqueous NaOH solution), and the electrolysis can be performed similarly in both a normal pressure system and an elevated pressure system. The electrolysis system of this embodiment includes an electrolyte solution replenishing means, and a water replenishing means. The electrolyte solution replenishing means includes the alkaline water tank 24 with the alkaline water 25 of high concentration stored therein, and the pump 23. The water replenishing means includes the pure water tank 21 with the pure water 22 stored therein, and the pump 20.

Second Embodiment

With reference to FIG. 1, the description has been made above about the example in which in the anolyte discharge means, the anolyte discharged from the anode side gas/liquid mixed fluid discharge line 16 is separated by the anode side gas/liquid separation means 17 into oxygen gas as anode-side gas and the anolyte, and the anolyte after the separation of the oxygen gas is supplied by the anolyte circulation line 18 to the opening 30 at the top end of the bag-shaped membrane pack 32 made from the aqueous solution permeable membrane. Closure of the valve 6 arranged above the anode side gas/liquid separation means 17 can therefore establish a mode in which oxygen gas as anode side electrolytic gas can be supplied as an anode side gas/liquid mixed fluid from the anode side gas/liquid mixed fluid discharge line 16 to the bag-shaped membrane pack 32 via the anolyte circulation line 18 without its separation by the anode side gas/liquid separation means 17. A description will hereinafter be made about this second embodiment.

In this case, a large volume of oxygen gas generated through electrolysis at the anode is supplied to the opening 30 at the top end of the bag-shaped membrane pack 32. However, the large volume of oxygen gas is not dissolved in the electrolyte solution in the interior of the bag-shaped membrane pack 32, but is recovered or released into the atmosphere through the water seal unit 28 by way of the opening 30 at the top end, the gas discharge pipe 29, and the anode side electrolytic gas discharge line 27. In the anolyte, dissolved hydrogen gas and bubble-shaped hydrogen gas, which have permeated from a counter electrode chamber, that is, the cathode chamber 2, and dissolved oxygen gas and bubble-shaped oxygen gas, which have generated through electrolysis at the anode, are mixed in addition to the above-described large volume of oxygen gas. Here, the bubble-shaped oxygen gas remains in the bag-shaped membrane pack 32 made from the aqueous solution permeable membrane, and only electrolyte solution, which contains the dissolved oxygen gas, the dissolved hydrogen gas and the bubble-shaped hydrogen gas of small diameter, is discharged from the bag-shaped membrane pack 32 into the common circulation tank 5.

In the case of the second embodiment in which the anode side gas/liquid mixed fluid is supplied, as it is, from the anode side gas/liquid mixed fluid discharge line 16 to the bag-shaped membrane pack 32 via the anolyte line 18 without separation of the anode side electrolytic gas from the anode side gas/liquid mixed fluid, the alkaline water electrolysis system may have a configuration that the anode chamber 3 and the bag-shaped membrane pack 32 are directly connected by way of the anode side gas/liquid mixed fluid discharge line 16 and the anolyte circulation line 18 without arrangement of the anode side gas/liquid separation means 17 and the valve 6. The purification method of the present invention for electrolytic gas can also be applied to an elevated pressure system. In the case of the elevated pressure system, an anode chamber and a cathode chamber are both pressurized. Accordingly, a differential pressure between the anode chamber and the cathode chamber in the system has a similar correlation with that in the normal pressure system, so that upon filtration through the bag-shaped membrane pack 32, a similar phenomenon takes place as in the case of the normal pressure system.

Third Embodiment

As described in the examples of the first embodiment and the second embodiment, the common circulation tank is common to the anode side and the cathode side in the alkaline water electrolysis system illustrated in FIG. 1. The catholyte circulation means and the anolyte circulation means have the configuration that the electrolyte solution prepared by mixing the anolyte and the catholyte together is circulated between the cathode chamber 2 and the common circulation tank 5 and between the anode chamber 3 and the common circulation tank 5, respectively. However, the present invention should not be limited to the configuration exemplified above, and may have a configuration (not illustrated) that the catholyte circulation means alone is arranged, only the catholyte is circulated between a cathode side circulation tank similar to the common circulation tank 5 and the cathode chamber 2, and the anolyte is not circulated.

Furthermore, in addition to alkaline water electrolysis, the present invention can also be applied to aqueous solution electrolysis such as brine electrolysis, electrolysis of an alkali metal halide such as potassium chloride, electrolysis of an aqueous solution using a solid polymer as an electrolyte, sulfuric acid electrolysis, and hydrochloric acid electrolysis. In this electrolysis, a cathode side circulation tank and an anode side circulation tank are arranged in place of the common circulation tank 5 illustrated in FIG. 1. It is further configured so that on the side of the cathode, the catholyte is circulated between the cathode side circulation tank and the cathode chamber, and on the side of the anode, the anolyte is circulated between the anode side circulation tank and the anode chamber. Without being limited to the above-described example, it may also be configured that only one of the cathode side circulation tanks or the anode side circulation tank is arranged. For example, the cathode side can be configured to dispose the catholyte circulation means for the circulation of the electrolyte solution, while the anode side can be configured to discharge the anolyte out of the system from the anolyte circulation line.

A description will next be made about a case in which a brine electrolysis cell or a potassium chloride electrolysis cell is employed as an electrolysis cell for use in the purification method of the present invention for electrolytic gas.

Forth Embodiment

FIG. 2 illustrates a flow in the case that the brine electrolysis cell is used as the electrolysis cell in the present invention. In the example illustrated in FIG. 2, a brine electrolysis cell 101 is used, an electrolyte solution made of an aqueous solution of sodium hydroxide or potassium hydroxide is used as a catholyte, and an electrolyte solution made of brine is used as an anolyte. Further, as circulation tanks, a cathode side circulation tank 105a with a bag-shaped membrane pack (membrane bag) 132a disposed therein and an anode side circulation tank 105b with no bag-shaped membrane pack (membrane bag) disposed therein are used. Also illustrated are an anode chamber 103 and a cation exchange membrane 104.

As transfer paths for the electrolyte solution on the side of the cathode, a catholyte circulation means and a cathode side gas separation means are arranged. The catholyte circulation means includes a catholyte supply means and a catholyte discharge means. The catholyte supply means has the cathode side circulation tank 105*a*, a catholyte supply line 114 connected to a bottom part of the cathode side circulation tank 105*a*, and a circulation pump 108. Pure water 122 is supplied by a cathode side pump 123 from a pure water tank 121 to the cathode side circulation tank 105*a*, and the catholyte is supplied from the cathode side circulation tank 105*a* into a cathode chamber 102 via the catholyte supply line 114 and the circulation pump 108.

The catholyte discharge means is configured as will be described below. The catholyte after the electrolysis treatment, which has been discharged from a cathode side gas/liquid mixed fluid discharge line 109, is separated by a cathode side gas/liquid separation means 110 into hydrogen gas as cathode side electrolytic gas and the catholyte. The catholyte after the electrolysis treatment and the separation of the hydrogen gas is supplied to the bag-shaped membrane pack 132*a*, which has an opening 130*a* at a top end thereof and is closed at an entire bottom wall 131*a* and an entire side wall 133*a*, through a catholyte circulation line 111. The bag-shaped membrane pack 132*a* is disposed in the cathode side circulation tank 105*a* with a clearance left there between, and the catholyte after the electrolysis treatment, which has been supplied into the bag-shaped membrane pack 132*a*, is allowed to permeate from the entire side wall 133*a* and the entire bottom wall 131*a* of the bag-shaped membrane pack 132 into the cathode side circulation tank 105*a*. In the catholyte supplied into the bag-shaped membrane pack 132*a*, oxygen gas bubbles and chlorine gas bubbles of large diameter, hydrogen gas bubbles of small diameter, and the like coexist along with hydrogen gas, which has not been separated by the gas/liquid separation, and permeated chlorine gas, which is of the cathode chamber origin and has permeated from the cathode chamber 103. Here, the bubble-shaped chlorine gas and the bubble-shaped oxygen gas, which coexist in the catholyte, remain in the bag-shaped membrane pack 132*a* for their large diameter, and the electrolyte solution with the bubble-shaped hydrogen gas of small diameter contained therein is allowed to permeate under a differential pressure caused by its own weight from the bag-shaped membrane pack 132*a* into the cathode side circulation tank 105*a*. Coexisting bubble gases of large diameter such as the bubble-shaped chlorine gas and the bubble-shaped oxygen gas are therefore not circulated to the electrolysis cell even if they coexist in the catholyte.

The catholyte after the electrolysis treatment, which has been discharged from the bag-shaped membrane pack 132*a* into the cathode side circulation tank 105*a*, is supplied by the circulation pump 108 to the cathode chamber 102 via the catholyte supply line 114. The cathode side gas separation means has the cathode side gas/liquid mixed fluid discharge line 109, the cathode side gas/liquid separation means 110, and a cathode side electrolytic gas discharge line 112. The cathode side gas/liquid separation means 110 is connected to a water seal unit 119 via the cathode side electrolytic gas discharge line 112. The water seal unit 119 holds water inside. The cathode side electrolytic gas discharge line 112 is immersed at a distal end thereof in the water inside the water seal unit 119. The separated hydrogen gas is purified to high purity and is recovered. It is to be noted that the hydrogen gas in upper parts of the bag-shaped membrane pack (membrane bag) 132*a* and the cathode side circulation tank 105*a* is recovered from a water seal unit via a cathode side gas discharge pipe 131.

The anolyte circulation means includes an anolyte supply means and an anolyte discharge means. The anolyte supply means has the anode side circulation tank 105*b*, an anolyte supply line 115 connected to a bottom part of the anode side circulation tank 105*b*, and a circulation pump 108. Saturated brine is supplied as supply brine 125 by a pump 123 from a supply brine tank 124, the anolyte in the anode side circulation tank 105*b* is mixed with the saturated brine in the anolyte supply line 115, and the resulting mixed solution is supplied as an anolyte before an electrolysis treatment into the anode chamber 103 via the circulation pump 108.

The anolyte discharge means is configured as will be described below. An anolyte after the electrolysis treatment discharged from an anode side gas/liquid mixed fluid discharge line 116 is separated by an anode side gas/liquid separation means 117 into chlorine gas as anode side electrolytic gas and the anolyte after the electrolysis treatment. The anolyte after the separation of the chlorine gas is supplied to the anode side circulation tank 105*b* via an anolyte circulation line 118. The chlorine gas in an upper part of the anode side circulation tank 105*b* is recovered from a water seal unit via a gas discharge pipe 129. The anolyte after the electrolysis treatment, which has been supplied into the anode side circulation tank 105*b*, is supplied by the circulation pump 108 to the anode chamber 103 via the electrolyte solution supply line 115.

An anode side gas separation means has the anode side gas/liquid mixed fluid discharge line 116, the anode side gas/liquid separation means 117, and an anode side electrolytic gas discharge line 127. The anode side gas/liquid separation means 117 is connected to a water seal unit 128 via the anode side electrolytic gas discharge line 127. The water seal unit 128 holds water inside. The anode side electrolytic gas discharge line 127 is immersed at a distal end thereof in the water inside the water seal unit 128, and the separated chlorine gas as the anode side electrolytic gas is separated and recovered. It is to be noted that a similar electrolysis system can also be configured employing an alkali metal halide electrolysis cell that uses an aqueous solution of a halide such as a fluoride, bromide or iodide in place of brine in the brine electrolysis cell.

Fifth Embodiment

In the brine electrolysis system illustrated in FIG. 2, the circulation tanks are disposed on the anode side and the cathode side, respectively. The description has hence been made above about the example in which the anolyte and the catholyte circulate through the catholyte means and the anolyte means, respectively. The present invention may however have a configuration that the catholyte means alone is disposed, only the catholyte is circulated between the cathode side circulation tank 105*a* and the cathode chamber 102, and the anolyte is not circulated.

Sixth Embodiment

In the brine electrolysis system illustrated by way of example in FIG. 2, the circulation tanks are disposed on the anode side and the cathode side, respectively, and as the circulation tanks, the cathode side circulation tank 105*a* with the bag-shaped membrane pack 132*a* disposed therein and the anode side circulation tank 105*b* with no bag-shaped membrane pack disposed therein are used. However, the present invention should not be limited to the foregoing. For example, a bag-shaped membrane pack may also be disposed in the anode side circulation tank 105b, and the anolyte may be circulated to the anode chamber after allowing it to permeate through the bag-shaped membrane pack so that the coexisting gas babbles of large diameter are caused to remain inside the bag-shaped membrane pack and are hence eliminated. In this manner, the anode side electrolytic gas can be also purified at the same time.

Seventh Embodiment

In the fourth embodiment and the sixth embodiment, there is described the example in which "the anolyte after the electrolysis treatment, which has been discharged from the anode side gas/liquid mixed fluid discharge line 116, is separated by the anode side gas/liquid separation means 117 into chlorine gas as anode side electrolytic gas and the anolyte after the electrolysis treatment, and the anolyte after the electrolysis treatment and the separation of the chlorine gas is supplied to the anode side circulation tank 105b via the anolyte circulation line 118." Without being limited to the foregoing, however, the anolyte after the electrolysis treatment, which has been discharged from the anode side gas/liquid mixed fluid discharge line 116, may be supplied as an anode side gas/liquid mixed fluid to the anode side circulation tank 105b or the bag-shaped membrane pack disposed in the anode side circulation tank 105b without gas/liquid separation by the anode side gas/liquid separation means 117 into the chlorine gas as anode side electrolytic gas and the anolyte after the electrolysis treatment.

Moreover, the purification method of the present invention for electrolytic gas can also be applied to an elevated pressure system. In the case of the pressurized system, an anode chamber and a cathode chamber are both pressurized. Accordingly, a differential pressure between the anode chamber and the cathode chamber in the system has a similar correlation with that in the normal pressure system, so that upon filtration through the bag-shaped membrane pack, a similar phenomenon takes place as in the case of the normal pressure system.

EXAMPLE

The present invention will next be described in further detail based on a working example, although the present invention should not be limited to the working example.

Example 1

As an electrolysis cell, an alkaline water electrolysis cell operated according to the flow illustrated in FIG. 1 was used. A test was conducted in the electrolysis cell 1 which had an electrolysis area of 16 dm². The anode chamber 3 (volume: 18 L) and the cathode chamber 2 (volume: 18 L) were both made of Ni, and as an anode, an expanded mesh (thickness: approx. 1.0 mm×SW (short width): approx. 4.0 mm×LW (long width): approx. 8.0 mm) with an activated anode coating applied thereto was used. As a cathode, a fine mesh (thickness: approx. 0.2 mm×SW (short width): 2.0 mm×LW (long width): 1.0 mm) with a noble metal-based activated cathode coating applied thereto was used. As the membrane 4 of the electrolysis cell 1, a film-shaped membrane of 250 µm thickness formed by impregnating a nonwoven fabric, which was made of PPS (polyphenylene sulfide) and had been subjected to a hydrophilic treatment, with a high molecular polymer was used. The film-shaped membrane was held between both the electrodes, followed by assembly into a zero-gap state.

As the bag-shaped membrane pack 32, those made from the below-described three membrane materials, respectively, were used separately. They were open at top walls thereof, were closed at bottom walls thereof, and were cylindrical. Described specifically, the following bag-shaped membrane bodies were separately used: a bag-shaped membrane pack formed with "ZIRFON PERL UTP 500" (trade name, product of AGFA-Gevaert NV, thickness: 500 µm) based on PSF (polysulfone) formed from PSF and $ZrO_2$; a bag-shaped membrane pack formed with a similar nonwoven PPS fabric (thickness: 500 µm) as the membrane 4 for the division of the above-described electrolysis cell, and impregnated with a high molecular polymer; and a bag-shaped membrane pack using "POREFLON FP-500" (trade name, product of Sumitomo Electric Fine Polymer, Inc., thickness: 500 µm) which is a porous membrane of PTFE (polytetrafluoroethylene). As shapes of the above-described bag-shaped membrane bodies, cylindrical ones were used. They each were 50 cm in height, 20 cm in diameter, 3454 cm² in surface area, and 15.7 L in internal volume, open at a top wall, and closed at a bottom wall.

As a circulation method of an electrolyte solution in this Example, a common electrolyte solution was supplied by the circulation pump 8 at a flow rate of 0.5 L/min to 2.0/min from the common circulation tank 5 (electrolyte solution volume: 32 L), which was disposed below the alkaline water electrolysis cell 1, to the anode chamber 3 and the cathode chamber 2 via electrolyte solution supply nozzles, respectively, as illustrated in FIG. 1. Gas/liquid mixed fluids discharged from respective nozzles in upper parts of the electrolysis cell were separated into liquid fractions and gaseous fractions via the gas/liquid separator means 10 and 17, respectively. The liquid fractions were both returned to the common circulation tank 5, whereas the gas fractions were each released out of the system. Operation conditions were set as follows: 40 A/dm², electrolyte solution: 30 mass % KOH, electrolysis temperature: 75 to 85° C., operation under atmospheric pressure, and predetermined conditions were set as to the differential pressure in a cell system by water sealing oxygen gas and hydrogen gas discharged from the anode chamber and the cathode chamber, respectively. For the prevention of vibrations of the membrane 4 during the operation, the differential pressure between the anode chamber and the cathode chamber was maintained at 50 to 100 mmH₂O. Further, a state of pressurization around the cathode was maintained in this Example with a purpose of raising the purity of the hydrogen gas.

The operation was performed while continuously supplying, to the common circulation tank 5, pure water in an amount corresponding to the water consumption through electrolysis. A test was conducted without performing the operation at night. In a mode of performing the operation for 6 hours every day 5 days for the acquisition of reproducible data, intermittent operation was performed in a manner that every morning, the electrolyte solution was supplied from the common circulation tank 5 to the electrolysis cell 1 and the operation was started, the operation was stopped at night, and the electrolyte solution was discharged from the electrolysis cell 1 and was recovered in the common circulation tank 5. Even in such operation, the aqueous alkaline solution (here, caustic potash KOH) provided at the beginning was not consumed substantially, operation was feasible at the desired concentration, and continuous operation was possible with addition of pure water in the amount corresponding to the water broken down through electrolysis. Further, alkaline mist that accompanied the discharged hydrogen gas was not much in amount in the 5-day operation. It is to be noted that as an aqueous alkaline solution to be used as an electrolyte solution, use of caustic soda NaOH brings about exactly the same results, and therefore the present invention should not be limited to caustic potash KOH used in this Example.

To each of the bag-shaped membrane bodies (membrane bags) 32 made of the respective materials described above and disposed one after another in the common circulation tank 32, the electrolyte solution and the gas/liquid mixed electrolyte solution were supplied. As a result, it was first confirmed that the electrolyte solution was allowed to permeate under its own weight into the common circulation tank 5. It was also confirmed that by allowing the electrolyte solution with coexisting gas bubbles to permeate through the bag-shaped membrane pack 32, hydrogen gas (hydrogen gas as a product) discharged from the electrolysis process was provided with high purity whichever bag-shaped membrane pack was used. In addition, it was also found that the electrolytic gas varied in purity depending on the material of the bag-shaped membrane pack (membrane bag), thereby enabling to confirm that the product can be obtained with still higher purity by selecting an adequate membrane in view of the electrolyte and electrolysis conditions. Details will be mentioned subsequently herein.

Comparative Example 1

Electrolysis was conducted in a similar system as in Example 1 under the same electrolysis conditions as in Example 1 except that in the alkaline water electrolysis cell of FIG. 1, the three membrane materials used as forming materials for the bag-shaped membrane bodies in Example 1 were individually used as the membrane dividing the cathode chamber and the anode chamber in the electrolysis cell and the bag-shaped membrane pack 32 was not disposed in the common circulation tank 5 in every electrolysis.
<Test Results>

The purities of hydrogen gas and oxygen gas obtained as cathode side electrolytic gas and anode side electrolytic gas, respectively, from the electrolysis process conducted in Example 1 and Comparative Example 1 are presented in Table 1 and Table 2, respectively. The purities presented in the tables each indicate the purity of the corresponding electrolytic gas, which was obtained after operation for 6 hours every day in the intermittent operation test conducted for 5 days, in terms of a range from a minimum value to a maximum value.

TABLE 1

Test Results of Example 1

| Base material of aqueous solution permeable bag-shaped membrane pack | Purity of electrolytic gas [%] | |
| --- | --- | --- |
| | Hydrogen gas | Oxygen gas |
| PSF (polysulfone) | 99.98 to ≥99.99 | 99.95 to 99.98 |
| PPS (polyphenylene sulfide) | 99.96 to 99.99 | 99.94 to 99.97 |
| PTFE (polytetrafluoroethylene) | 99.91 to 99.94 | 99.9 to 99.94 |

As the membrane of the electrolysis cell, a PPS membrane subjected to a hydrophilic treatment was used.

TABLE 2

Test Results of Comparative Example 1

| Base material of membrane in electrolysis cell (bag-shaped membrane pack was not used) | Purity of electrolytic gas [%] | |
| --- | --- | --- |
| | Hydrogen gas | Oxygen gas |
| PSF (polysulfone) | 99.90 to 99.94 | 99.87 to 99.92 |
| PPS (polyphenylene sulfide) | 99.89 to 99.92 | 99.86 to 99.90 |
| PTFE (polytetrafluoroethylene) | 99.4 to 99.8 | 99.2 to 99.6 |

From the results of Tables 1 and 2, it has been confirmed that whichever membrane material was used, the purities of the electrolytic gases were successfully improved in Example 1 compared with Comparative Example 1 in which the bag-shaped membrane pack 32 was not disposed in the common circulation tank 5. A reason for this improvement is considered attributable to the remaining of coexisting gas bubbles of large diameter, which had been mixed in the electrolyte solution, in the interior of the bag-shaped membrane pack 32 disposed in the common circulation tank 5 and the resulting successful elimination of the coexisting gas bubbles of large diameter from the electrolyte solution to be supplied continuously from the common circulation tank 5 into the electrolysis cell 1. As a consequence of the foregoing, it is therefore considered that the coexisting gas bubbles of large diameter were no longer circulated to the electrolysis cell 1, and even if the electrolyte solution was vigorously agitated by gases generated at the electrodes during re-electrolysis, the dissolved gas in the electrolyte solution was suppressed from migrating from the liquid phase to the gas phases along with the corresponding gases so generated. It is further considered that as a result, the electrolytic gases were not reduced in purity and quality and therefore the product gases were successfully provided with improved purity.

From the measurement results of the purities of hydrogen gas and oxygen gas produced as electrolytic gases from the electrolysis process as presented in Table 1, it has been confirmed that the selection of a PSF-based membrane or a membrane formed by impregnating a non-woven PPS fabric with a high molecular polymer as the material of the bag-shaped membrane pack (membrane bag) 32 can achieve to stably obtain electrolytic gases with a high purity of 99.94% or higher. With respect to hydrogen gas as cathode side electrolytic gas in particular, it was possible to obtain a high-purity product over 99.96%. As presented in Comparative Example 1 in Table 2, on the other hand, the concentration of hydrogen gas as cathode side electrolytic gas cannot be raised to a purity of 99.95% or higher if a bag-shaped membrane pack (membrane bag) is not used upon circulation of an electrolyte solution. If this is the case, a purification treatment is additionally needed.

With respect to oxygen gas as anode side electrolytic gas, on the other hand, impurity gases of large bubble diameter (coexisting gas bubbles) are also eliminated from the electrolyte solution, which is to be circulated into the electrolysis cell 1, by allowing the circulating electrolyte solution to permeate through the bag-shaped membrane pack (membrane bag) disposed in the common circulation tank 5. It has been confirmed that as presented in Table 1, purified oxygen gas having a purity of 99.94% or higher was hence successfully obtained as anode side electrolytic gas in Example 1.

In the case of the conventional method that does not use a bag-shaped membrane pack (membrane bag) upon circulation of an electrolyte, on the other hand, it was unable to obtain, as anode side electrolytic gas, oxygen gas having a purity higher than 99.92% in terms of concentration as presented in Table 2.

The description has been made above about the electrolysis system in the case of the use of the alkaline water electrolysis cell. In a case that a brine electrolysis cell or another alkali halide electrolysis cell was used, similar results were obtained as in the case of the use of the above-described alkaline water electrolysis cell.

INDUSTRIAL APPLICABILITY

According to the present invention, by the extremely simple method that forms a bag-shaped membrane pack (membrane bag) with a membrane material having a pore size smaller than gas bubbles of large diameter coexisting in an electrolyte solution to be used under circulation, an extremely large permeation area, and an effective filter function, and disposes it in an circulation tank, the coexisting gas bubbles of large diameter can be caused to remain for their elimination in the bag-shaped membrane pack, and as a consequence the gas bubbles coexisting in the electrolyte solution to be circulated to an electrolysis cell can be made fewer. Moreover, according to the above-described method, the gas bubbles of large diameter can be preferentially eliminated, and therefore dissolved gas in the electrolyte solution is prevented from migrating from a liquid phase to a gas phase along with gas generated at an electrode as a result of vigorous agitation of the generated gas by the gas bubbles coexisting in the electrolyte solution during re-electrolysis. Hence, the electrolytic gas is no longer reduced in purity and quality, and the product gas can be provided with improved purity. Additional inclusion of a subsequent gas purification step is obviated accordingly.

When obtaining electrolytic gases by continuously subjecting an electrolyte solution to an electrolysis treatment while circulating it by an circulation tank, the present invention can therefore improve the purity of hydrogen gas as cathode side electrolytic gas to 99.9% or higher and the purity of oxygen gas as anode side electrolytic gas to a significantly high level without installation or inclusion of reaction columns which use metal catalysts, respectively, some other facilities such as special drive force generators, and additional steps, all of which have conventionally been needed for the purification of the electrolytic gases. According to the present invention, the area and volume of facilities can be also reduced as it is unnecessary to install or include any ancillary facilities or additional steps for the purification of the electrolytic gases. Moreover, the purification method and electrolysis system according to the present invention are free of vibrations or noise, or from mechanical damage during long-term operation, which would otherwise be caused by such ancillary facilities or additional steps, and can be stably operated over a long term, leading to a significant reduction in facilities maintenance cost. The present invention therefore has extremely high utility value in practice.

REFERENCE SIGNS LIST

1: electrolysis cell
2: cathode chamber
3: anode chamber
4: membrane/ion exchange membrane
5: common circulation tank
11: catholyte circulation line
14: catholyte supply line
15: anolyte supply line
16: anode side gas/liquid mixed fluid discharge line
17: anode side gas/liquid separation means
18: anolyte circulation line
27: anode side electrolytic gas discharge line
29: gas discharge pipe
30: opening
31: entire bottom wall
32: bag-shaped membrane pack
33: entire side wall
101: electrolysis cell
102: cathode chamber
103: anode chamber
104: membrane/ion exchange membrane
105$a$: catholyte circulation tank
109: cathode side gas/liquid mixed fluid discharge line
110: cathode side gas/liquid separation means
111: catholyte circulation line
112: cathode side electrolytic gas discharge line
114: catholyte supply line
127: anode side electrolytic gas discharge line
129: gas discharge pipe
130$a$: opening
131$a$: entire bottom wall
132$a$: bag-shaped membrane pack (membrane bag)
133$a$: entire side wall
131: cathode side electrolytic gas discharge line

The invention claimed is:

1. A purification method of electrolytic gas generated in an electrolysis cell having a cathode and an anode into which an electrolyte solution is supplied while circulating the electrolyzed electrolyte solution via a circulation tank disposed outside the electrolysis cell, comprising:

disposing a bag-shaped membrane pack in an interior of the circulation tank with a clearance left between the bag-shaped membrane pack and an inner wall of the circulation tank, wherein the bag-shaped membrane pack is made of a porous membrane material of a construction and is configured to cause first gas bubbles of the electrolytic gas generated from the anode, which coexist with the electrolyte solution and have a first diameter larger than a second diameter of second gas bubbles of the electrolytic gas generated from the cathode, to remain without permeation, and wherein the bag-shaped membrane pack is of a shape having an opening at a top end thereof and closed at an entire side wall and entire bottom wall thereof and has a permeation area at an entire side wall and an entire bottom wall;

supplying the electrolyte solution coexisting with the first gas bubbles and the second gas bubbles of the electrolytic gas from the opening of the bag-shaped membrane pack into an interior of the bag-shaped membrane pack;

allowing the electrolyte solution, which has been supplied into the interior of the bag-shaped membrane pack, and the second gas bubbles, to permeate from the bag-shaped membrane pack into the circulation tank through the entire side wall and the entire bottom wall under a differential pressure caused by an own weight of the electrolyte solution, thereby causing the electrolytic gas and the first gas bubbles to remain in the interior of the bag-shaped membrane pack; and repeating the electrolysis while continuously circulating the electrolyte solution coexisting with a fewer total gas bubbles of the first gas bubbles and the second gas bubbles from the circulation tank to the electrolysis cell than the total gas bubbles in a previous electrolysis, whereby the electrolytic gas generated from the electrolysis cell is purified.

2. The purification method according to claim 1, comprising:

using, as the electrolysis cell, an alkaline water electrolysis cell having a cathode chamber and an anode chamber separated by a membrane or an ion exchange membrane and having the cathode and the anode in the cathode chamber and the anode chamber, respectively, supplying the electrolyte solution of a common composition with a caustic alkali contained therein as a catholyte and an anolyte into the anode chamber and the cathode chamber of the electrolysis cell, and using the electrolysis circulation tank as a common circulation tank that is common to the catholyte and the anolyte, allowing cathode side electrolytic gas of the electrolytic gas to generate in the cathode chamber and anode side electrolytic gas of the electrolytic gas to generate in the anode chamber, supplying the cathode side electrolytic gas, the catholyte, and the second gas bubbles of the cathode side electrolytic gas coexisting with the catholyte, and the anode side electrolytic gas, the anolyte, and the first gas bubbles of the anode side electrolytic gas coexisting with the anolyte from the opening into the interior of the bag-shaped membrane pack, thereby allowing the catholyte, the anolyte, and the second gas bubbles coexisting with the catholyte and the anolyte, respectively, to permeate from the bag-shaped membrane pack into the common circulation tank through the entire side wall and the entire bottom wall of the bag-shaped membrane pack under a differential pressure caused by own weights of the catholyte and the anolyte supplied into the bag-shaped membrane pack, thereby causing the cathode side electrolytic gas, the anode side electrolytic gas, and the first gas bubbles coexisting with the catholyte and the anolyte, respectively, to remain in the interior of the bag-shaped membrane pack, and repeating the electrolysis while continuously circulating the electrolyte solution of the common composition with the total gas bubbles coexisting with the catholyte and the anolyte, respectively, being fewer than a total gas bubbles in a previous electrolysis, from the common circulation tank to the electrolysis cell, whereby at least one gas selected from the group consisting of hydrogen gas as the cathode side electrolytic gas and oxygen gas as the anode side electrolytic gas are purified.

3. An electrolysis system for obtaining purified electrolytic gas by performing electrolysis of an electrolyte solution, the electrolysis system comprising:

an electrolysis cell into which the electrolyte solution is supplied, the electrolysis cell having a cathode and an anode, a circulation tank for circulating the electrolyte solution through the electrolysis cell, and a bag-shaped membrane pack disposed in an interior of the circulation tank with a clearance left between the bag-shaped membrane pack and an inner wall of the circulation tank, the bag-shaped membrane pack being configured to enable purification of electrolytic gas generated from the electrolysis cell, wherein the bag-shaped membrane pack is made of a porous membrane material of a construction configured to cause first gas bubbles of the electrolytic gas generated from the anode, which coexist with the electrolyte solution and have a first diameter larger than a second diameter of second gas bubbles of the electrolytic gas generated from the cathode, to remain without permeation, and the second gas bubbles of the electrolytic gas generated from the cathode, which coexist with the electrolyte solution and have the second diameter smaller than the first diameter of the first gas bubbles of the electrolytic gas generated from the anode, to permeate, wherein the bag-shaped membrane pack is of a shape having an opening at a top end thereof and is closed at an entire side wall and an entire bottom wall thereof, and the bag-shaped membrane pack has a permeation area at the entire side wall and the entire bottom wall;

a circulation line configured to supply the electrolyte solution coexisting with the first gas bubbles and the second gas bubbles of the electrolytic gas from the opening of the bag-shaped membrane pack into an interior of the bag-shaped membrane pack, thereby allowing the electrolyte solution, which has been supplied into the interior of the bag-shaped membrane pack, and the second gas bubbles of the electrolytic gas generated from the cathode having the second diameter to permeate from the bag-shaped membrane pack into the circulation tank through the entire side wall and the entire bottom wall of the bag-shaped membrane pack under a differential pressure caused by an own weight of the electrolyte solution, thereby causing the electrolytic gas and the first gas bubbles of the electrolytic gas generated from the anode coexisting with the electrolyte solution, to remain in the interior of the bag-shaped membrane pack; and a supply line and a pump configured to continuously circulate the electrolyte solution with fewer of a total gas bubbles of the first gas bubbles and the second gas bubbles from the circulation tank to the electrolysis cell than a total gas bubbles in a previous electrolysis, thereby repeating the electrolysis.

4. The electrolysis system according to claim 3, wherein:

the electrolysis cell has a cathode chamber and an anode chamber separated by a membrane or an ion exchange membrane, and has the cathode and the anode in the cathode chamber and the anode chamber, respectively, the electrolyte is an anolyte and a catholyte, which are supplied into the electrolysis cell, the anolyte and the catholyte each comprise an aqueous caustic alkali solution of a common composition, the circulation tank is a common circulation tank, which is common to the catholyte and the anolyte, for mixing the catholyte and the anolyte and supplying the catholyte and the anolyte as the aqueous caustic alkali solution of the common composition to the cathode chamber and the anode side chamber, respectively, the electrolytic gas being purified is at least one gas selected from the group consisting of hydrogen gas generated from the cathode as a cathode side electrolytic gas in the cathode chamber and oxygen gas generated from the anode as an anode side electrolytic gas in the anode chamber the circulation line comprises:

a cathode side circulation line that supplies the cathode side electrolytic gas, the catholyte and the second gas bubbles coexisting with the catholyte from the opening into the interior of the bag-shaped membrane pack, and an anode side circulation line that supplies the anode side electrolytic gas, the anolyte, and the first gas bubbles coexisting with the anolyte from the opening into the interior of the bag-shaped membrane pack, thereby allowing the catholyte, the anolyte, and the second gas bubbles coexisting with the catholyte and the anolyte, respectively, to permeate from the bag-shaped membrane pack into the common circulation tank through the entire side wall and the entire bottom wall of the bag-shaped membrane pack under a differential pressure caused by own weights of the catholyte and the anolyte supplied into the interior of the bag-shaped membrane pack, and thereby causing the cathode side electrolytic gas, the anode side electrolytic gas, and the first gas bubbles coexisting with the catholyte and the anolyte, respectively, to remain in the interior of the bag-shaped membrane pack, and the supply line and the pump that continuously circulate the electrolyte solution of the common composition with fewer ones of the total gas bubbles being fewer than a total gas bubbles in a previous electrolysis, which coexisted coexist with the catholyte and the anolyte, respectively, from the common circulation tank to the electrolysis cell, thereby repeating the electrolysis.

* * * * *